(12) United States Patent
Jorion

(10) Patent No.: US 9,703,004 B2
(45) Date of Patent: *Jul. 11, 2017

(54) HIGH THROUGHPUT PULSE HEIGHT ANALYZER

(71) Applicant: Schlumberger Technology Corporation, Sugar Land, TX (US)

(72) Inventor: Bruno Jorion, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,023

(22) Filed: May 17, 2016

(65) Prior Publication Data

US 2016/0363688 A1    Dec. 15, 2016

Related U.S. Application Data

(63) Continuation of application No. 14/116,314, filed as application No. PCT/US2012/038074 on May 16, 2012, now Pat. No. 9,354,351.

(Continued)

(51) Int. Cl.
*G01T 1/17* (2006.01)
*G01V 5/10* (2006.01)
(Continued)

(52) U.S. Cl.
CPC ............... *G01V 5/102* (2013.01); *G01T 1/17* (2013.01); *G01T 1/171* (2013.01); *G01T 1/362* (2013.01);
(Continued)

(58) Field of Classification Search
CPC ........... G01T 1/362; G01T 3/001; G01V 5/10; G01V 5/12
See application file for complete search history.

(56) References Cited

U.S. PATENT DOCUMENTS 3,866,044 A    2/1975   Grund
4,247,823 A    1/1981   Vun Kannon, Jr.
(Continued)

FOREIGN PATENT DOCUMENTS

EP    396464 A2    11/1990
GB    2263767 A    8/1993

OTHER PUBLICATIONS

Extended European Search Report for EP Application No. 12786234.0 dated Sep. 30, 2014.
(Continued)

*Primary Examiner* — Marcus Taningco
(74) *Attorney, Agent, or Firm* — Michael Dae

(57) ABSTRACT

A method and system for acquiring spectral information from an energy sensitive nuclear detector is disclosed. The method includes detecting nuclear radiation at a detection device and generating an electronic input pulse indicative of energy deposited in the detection device. The method further includes integrating the electronic input pulse at an integrating device to produce an integrated output signal and digitally sampling the integrated output signal of the integrating device at intervals to produce a stream of digital samples. The method further includes resetting the integrator synchronously with a sampling clock when a limit condition is reached.

20 Claims, 17 Drawing Sheets

Related U.S. Application Data

(60) Provisional application No. 61/487,055, filed on May 17, 2011.

(51) Int. Cl.
  *G01T 1/36*   (2006.01)
  *G01T 3/00*   (2006.01)
  *G01V 5/12*   (2006.01)
  *G01V 13/00*  (2006.01)

(52) U.S. Cl.
  CPC ............... *G01T 3/001* (2013.01); *G01V 5/10* (2013.01); *G01V 5/12* (2013.01); *G01V 13/00* (2013.01); *G01V 2210/40* (2013.01)

(56) References Cited

U.S. PATENT DOCUMENTS

| | | |
|---|---|---|
| 4,540,883 A | 9/1985 | Randall |
| 4,816,307 A | 3/1989 | Honeycutt |
| 5,067,090 A | 11/1991 | Seeman |
| 5,077,530 A | 12/1991 | Chen |
| 5,122,662 A | 6/1992 | Chen et al. |
| 5,319,314 A | 6/1994 | Chen |
| 5,326,970 A | 7/1994 | Bayless |
| 5,349,195 A | 9/1994 | Dumont |
| 5,493,120 A | 2/1996 | Geagan |
| 5,884,234 A | 3/1999 | Jorion et al. |
| 6,703,606 B2 | 3/2004 | Adolph |
| 6,944,548 B2 | 9/2005 | Radtke et al. |
| 7,668,293 B2 | 2/2010 | Wraight et al. |
| 7,817,781 B2 | 10/2010 | Wraight et al. |
| 9,354,351 B2 | 5/2016 | Jorion |
| 2011/0024613 A1 | 2/2011 | Roberts |

OTHER PUBLICATIONS

International Search Report for PCT Application Serial No. PCT/US2012/038074 dated Nov. 28, 2012.

Jordanov, et al. "Digital pulse-shape analyzer based on fast sampling of an integrated charge pulse", IEEE Transactions on Nuclear Science, vol. 42, No. 4, Aug. 1995, pp. 683-687.

HIGH THROUGHPUT PULSE HEIGHT ANALYZER

CROSS-REFERENCE TO RELATED APPLICATIONS

This application is a continuation of co-pending U.S. patent application Ser. No. 14/116,314, filed Feb. 12, 2014, which is a National Stage Entry of International Application No. PCT/US2012/38074; filed May 16, 2012, which claims benefit of U.S. Provisional Patent Application Ser. No. 61/487,055, filed May 17, 2011. Each of the aforementioned related patent applications is herein incorporated by reference.

TECHNICAL FIELD

The present disclosure relates generally to nuclear well logging and particularly to systems and methods for gamma ray spectral data acquisition.

BACKGROUND

In nuclear well logging, it is frequently necessary to determine the energy that a particle or photon has deposited in a detection device. These detection devices provide an electrical signal that is indicative of the amount of energy deposited in a single event. The energy distribution of the gamma rays from a multitude of elements can be represented as a histogram, in which the abscissa represents the deposited energy or a function thereof, and the ordinate the number of events having a signal which falls into one of the discrete bins of the abscissa.

There are many variants of nuclear detectors which are well known in the field of nuclear measurements. A nuclear detector typically consists of a detecting material and a device or devices to convert and/or amplify the signal produced by the detector. Such detectors can include semiconductor detectors such as Germanium-detectors or scintillation detectors coupled to photon detectors, proportional counters, or the like.

The purpose of a gamma ray spectroscopy system is to determine the energy associated with the absorption of incident gamma rays by the detector (pulse events). Pulse events can be registered in histograms organized by energy levels (Multi-channel Analyzer, or MCA, spectra) and/or times of arrival (Multi-Channel Scaler, or MCS, spectra). The performance of such systems is measured in terms of energy resolution (ability to distinguish between two separate but adjacent energy levels), time resolution (ability to distinguish between two nearly coincident pulses), throughput (ability to process multiple adjacent pulses) and linearity (linear relationship between deposited energy in a pulse and associated histogram channel). A typical gamma ray acquisition system 100 is shown in FIG. 1 and includes detector 102, preamplifier 104, pulse height/MCS analyzer 108 and histogram acquisition memory 110. Detector signals associated with pulse events are typically fast rising unipolar pulses (rise time<10 ns) with a slower exponential decay (single or multiple time constants). Fall time constant(s) vary from 1 ns to a few µs, depending on the type of detector. The system 100 may additionally include well-known components such as a display 112, a microprocessor 114 and data storage/memory 116.

Classic pulse height analyzers rely on a shaping amplifier driving a sample-and-hold circuit (pulse stretcher) connected to an analog-to-digital convertor (ADC). The pulse shaper is a dispersive filter (pseudo Gaussian impulse response filters are typically used). Its purpose is two-fold: [1] increase the detector signal rise time to make it more suitable for peak sampling and [2] speed up signal return to baseline (by eliminating asymptotic behavior) to improve time resolution and reduce inter-symbol dependency. Such analyzers measure shaped pulse peak amplitudes and provide for good energy resolution (since the signal to digitize is being held constant by the sample & hold circuit). However, they have a limited throughput, due to ADC conversion time (typically 5 to 10 µs) and operate in a discontinuous fashion (i.e., the analyzer is disabled during a conversion). Such performance limitations make them inadequate to process the high count rates, which can be acquired by modern detectors.

SUMMARY

Disclosed herein is a method for acquiring spectral information from an energy sensitive nuclear detector and may include detecting nuclear radiation at a detection device and generating an electronic input pulse indicative of energy deposited in the detection device. The method may also include integrating the electronic input pulse at an integrating device to produce an integrated output signal, and digitally sampling the integrated output signal of the integrating device at intervals to produce a stream of digital samples. The integrator may reset synchronously with a sampling clock when a limit condition is reached.

Also disclosed herein is an apparatus for acquiring spectral information from an energy sensitive nuclear detector. The apparatus may comprise electronic means for detecting nuclear radiation and generating an electronic signal indicative of the energy deposited in a detection device, and an integrator for integrating the electronic signal indicative of the energy deposited in a detection device. The apparatus may further comprise electronic means to digitally sample the output signal of the integrator at an interval to produce a digitized pulse stream, and electronic means for obtaining the integral of the electronic signal from the digitized pulse stream and resetting the integrator synchronously with a sampling clock when a limit condition is reached.

Further disclosed herein is a downhole tool for acquiring spectral information. The downhole tool may comprise a generator configured to emit nuclear radiation into an earth formation surrounding a borehole, and a nuclear detector (in some applications, there may not be a generator, and the detector may be used to detect naturally occurring radiation). The downhole may also include data processing circuitry configured to detect nuclear radiation and generate an electronic signal indicative of the energy deposited in a detection device, data processing circuitry configured to integrate the electronic signal indicative of the energy deposited in a detection device to produce an output signal, data processing circuitry configured to digitally sample the output signal at an interval to produce a digitized pulse stream, and data processing circuitry configured to obtain the integral of the electronic signal from the digitized pulse stream and reset the data processing circuitry for integrating synchronously with a sampling clock when a limit condition is reached.

BRIEF DESCRIPTION OF THE DRAWINGS

FIG. 19A illustrates a plot when Tau=0 ns; FIG. 19B illustrates a plot when Tau=10 ns; FIG. 19C illustrates a plot when Tau=22 ns; and FIG. 19D illustrates a plot when Tau=30 ns.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

With the advent of new, faster scintillation materials with high intrinsic spectral resolution, a new acquisition system with very high throughput, minimal spectral distortion and/or minimum sacrifice of pulse height resolution has become a necessity. The present disclosure describes a novel acquisition system that combines high throughput and high spectral resolution through sophisticated digital signal processing and minimal analog electronics. Compared to earlier approaches, the present approach provides an improvement in the pile up rejection, and therefore helps minimize count rate dependent spectral distortion and may eliminate the use for pulse shape compensation.

Figure 1:
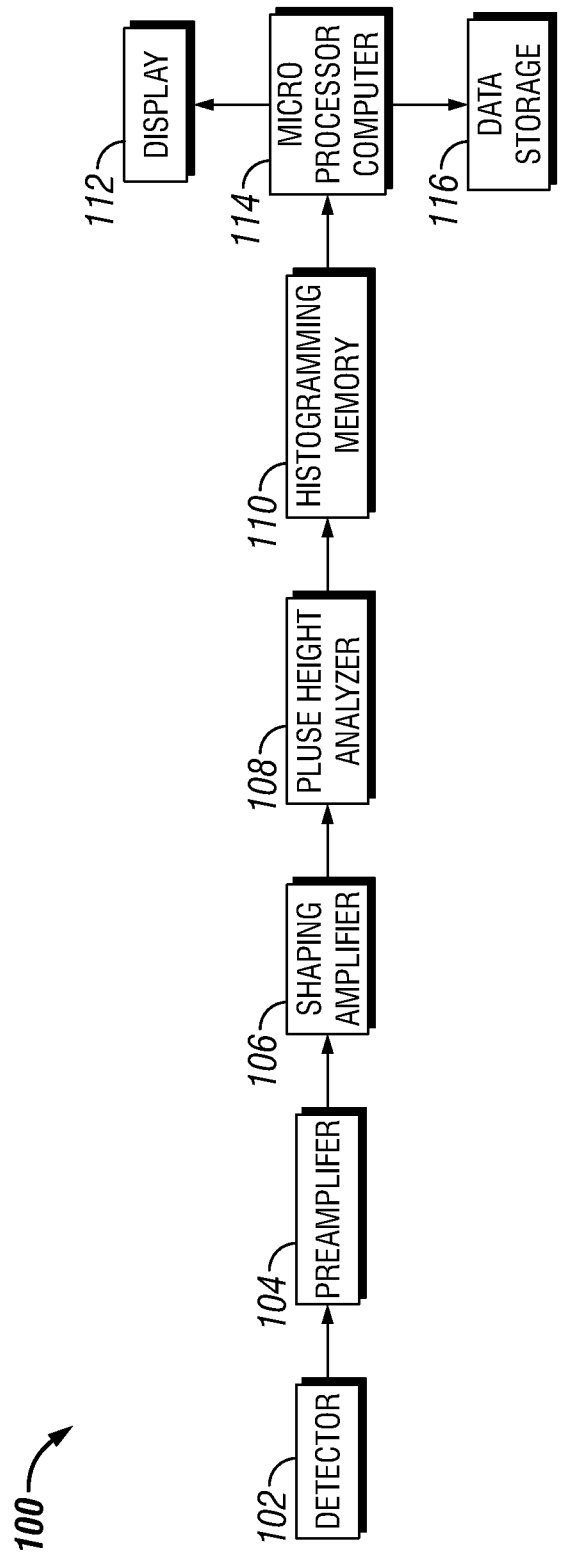
FIG. 1 shows a flowchart for a data acquisition chain for gamma-ray spectroscopy.
Figure 2C:
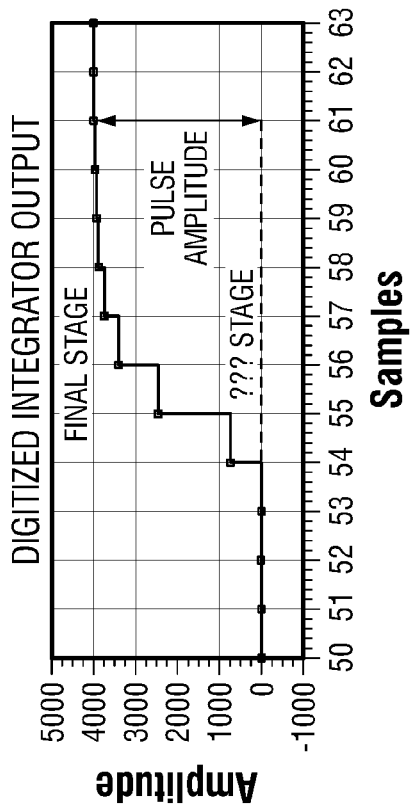
FIG. 2C shows a graphical representation of the digitized integrator output.
Figure 2D:
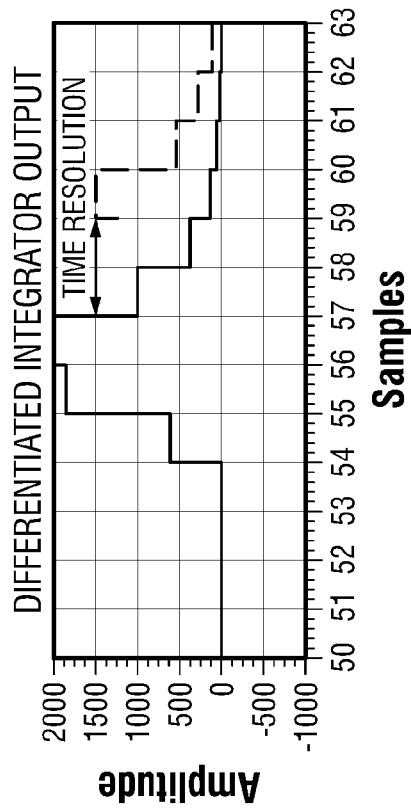
FIG. 2D shows a graphical representation of the differentiated integrator output with the indication of the pile up time resolution.
Figure 2A:
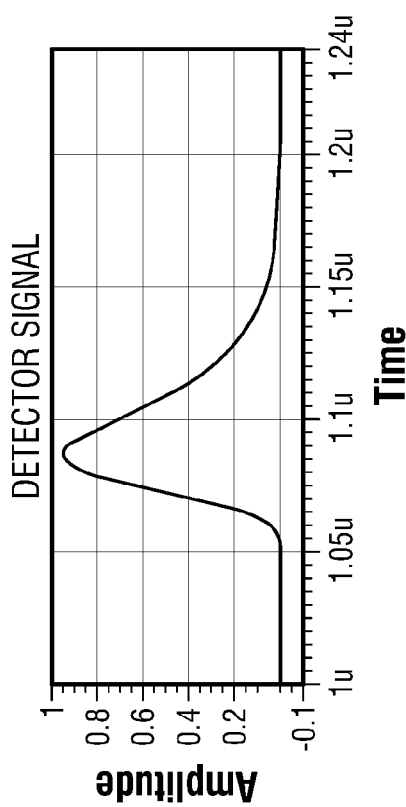
FIG. 2A shows a graphical representation of an input pulse to the integrator.
Figure 2B:
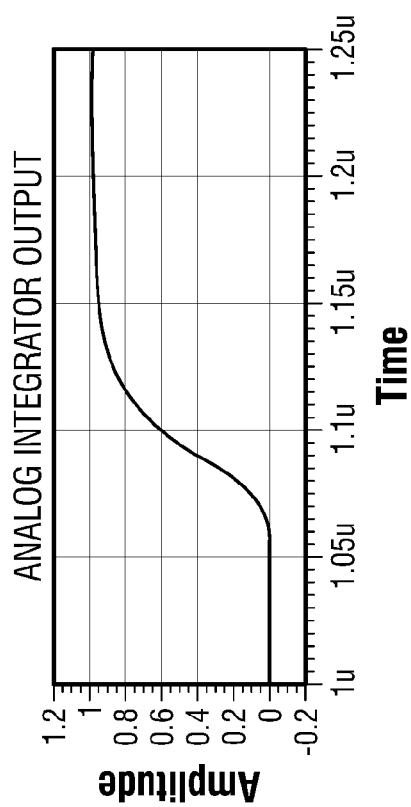
FIG. 2B shows a graphical representation of the output of the integrator.

The new method described herein represents a further evolution made possible by the availability of fast, high resolution ADCs, and to a lesser extent, improved performance of digital circuits available. Unlike previously mentioned methods which rely on shaped signal amplitude to evaluate nuclear pulse energy, the new implementation uses an analog integrator to capture the total charge at the detector output. The integrator output is then digitized by a high resolution ADC and sent to a digital processor. Referring now to FIG. 2A-D, such a technique provides for capturing the collected charge (as the difference between final and initial integrator states) with high energy resolution and minimal aliasing, since both measurements are taken on a quasi stationary signal. Good time resolution can be achieved by monitoring the charge collection on a sample by sample basis by differentiating the integrated signal as shown in FIG. 2. FIG. 2A shows the input pulse to the integrator, FIG. 2B shows the output of the integrator, FIG. 2C shows the digitized integrator output and FIG. 2D shows the differentiated integrator output with the indication of the pile up time resolution.

While providing near ideal conditions for nuclear pulse acquisition, the use of an integrator to acquire unipolar nuclear pulses is hampered by the resetting of the integrator periodically to help prevent the associated electronics from saturating. This leads to the implementation of so-called "gated integrators" that operate similarly to the pulse stretcher previously described and the use of which is well documented. In such applications, the integrator is initially reset and allowed to integrate a pulse during a preset time, after which it is reset again to acquire the next pulse. While providing good energy resolution, (and time resolution if a proper pileup detection scheme is utilized), such a method has limited throughput, due to the extra dead-time required by the integrator reset, during which no pulse acquisition can take place.

Figure 3:
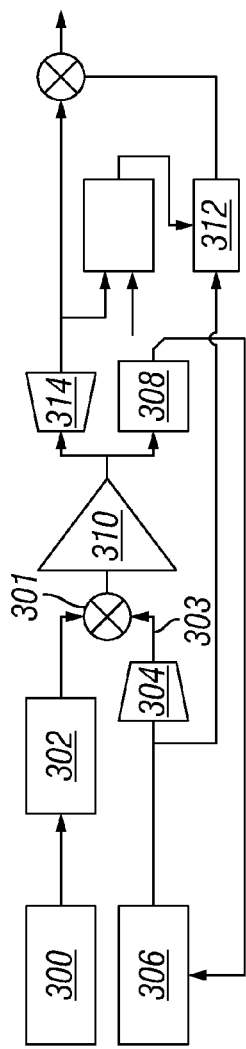
FIG. 3 shows a block diagram of an integrator employing synchronous reset in accordance with embodiments of the present disclosure.

The method of the present disclosure provides for using the integrator in a continuous fashion by supplying a reset signal that is synchronous with the ADC acquisition clock and therefore not subject to aliasing. Doing so allows (1) predicting the effects of the reset signal and (2) removing such effects from the samples acquired during the integrator reset, This provides for an uninterrupted data flow (including during integrator reset) and does not create dead-time. An illustrative implementation of a system with an integrator with synchronous reset is shown in FIG. 3. The configuration includes detector 300, a summing node 301 driven by the preamplifier 302 coupled to the detector 300, and a reset signal 303 generated by an auxiliary DAC 304. The control logic 306 initiates a reset DRST through the DAC 304 each time the limit sensor 308 is activated indicating that the integrator output headroom can no longer accommodate additional nuclear pulses. Synchronous reset signal DRST also transits to a Finite Impulse Response filter 312 (FIR) using the system impulse response ($R_k$, to DRST via the DAC) as coefficients. In this case, the FIR filter convolves the signal ($DRST_i$) with the impulse response of the system. Its output $$B_i = \sum_{k=0}^{n-1} (R_k \cdot DRST_{i-k}) \qquad \text{eq. 1}$$

represents an estimate of the system response to the reset signal $<DRST_i>$ and can be subtracted from the differentiator output to recreate a digital representation of the integrated detector signal. As noted above, the correction signal is not affected by aliasing since it is synchronous with the acquisition clock (within clock and ADC window aperture jitters) and is a repeatable representation of the analog reset signal.

$$Y_i = X_i - B_i = \{int(Sig)_i + DAC(DRST_i)\} - <DAC(DRST_i)> \cong \{int(SIG)_i\} \qquad \text{eq. 2}$$

FIR coefficients ($R_k$) can be acquired during dedicated calibration periods or in normal operation when no pulses are detected. In this case, the control logic 306 sets the calibrate line to activate recording while sending an impulse signal on DRST. The length of the sequence ($R_k$) is set to accommodate response time duration and system resolution.

The practical implementation shown describes an application for such a system and includes additional circuits to further improve performance and/or provide an optimal compromise between throughput and energy resolution. The ADC signal 314 is differentiated to help eliminate the signal baseline and simplify digital processing. The final pulse amplitude is obtained by summing all samples at the end in a digital integrator.

The use of the integrator configuration described above presents an additional advantage in that the reset is not synchronized with a pulse. The initial state of the integrator (at the onset of the charge collection) is undetermined and so is the integrator output voltage range, within which the pulse amplitude will be evaluated. This decouples the ADC 314 linearity from the actual signal value and has the effect of maintaining overall system linearity at the possible cost of reduced amplitude resolution.

While the preferred embodiment uses current integration for ideally capturing the integrated electrical current (i.e., total charge), different collection methods could be considered such as resonators, delay lines or other special analog processing approaches (e.g. the detector could produce a zero average signal as in the case of a bipolar input from an AC-coupled signal) and the method would apply, as long as a system impulse response can be defined without ambiguity.

Figure 4:
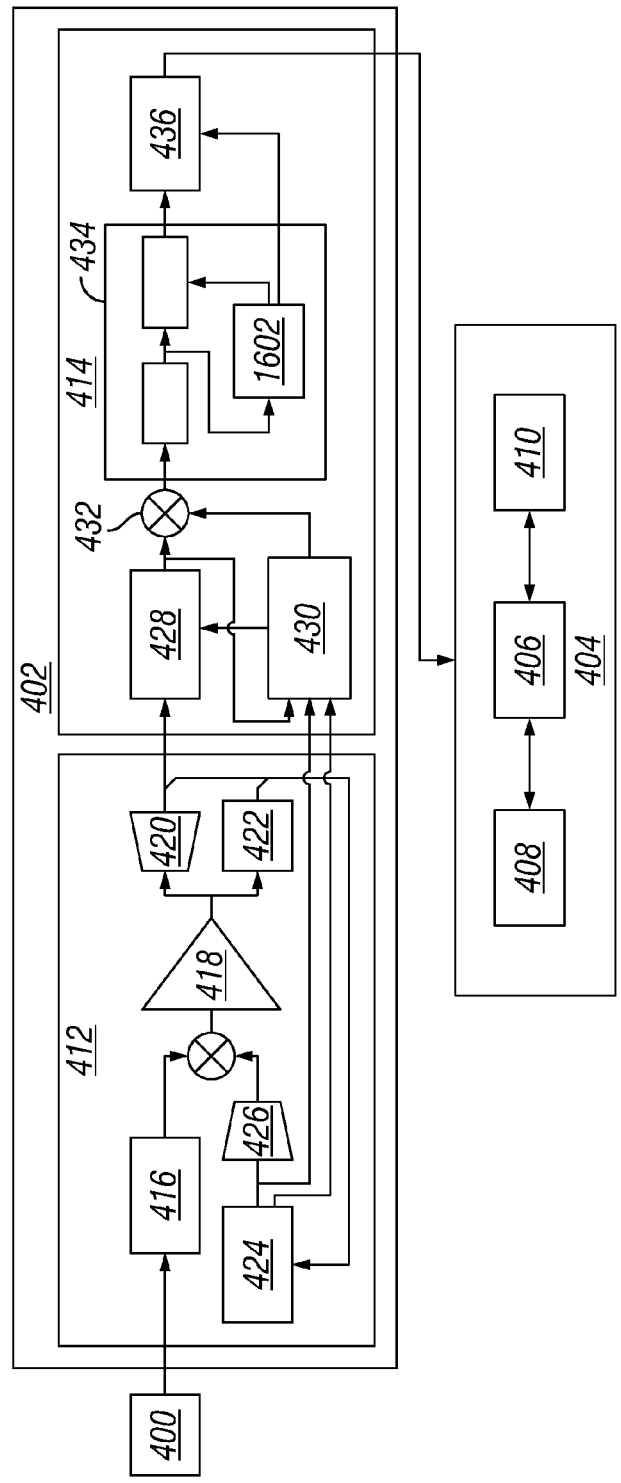
FIG. 4 shows a block diagram of an acquisition system in accordance with embodiments of the present disclosure.

The basic acquisition system of the new method is shown in FIG. 4, including detector 400, pulse height analyzer 402 (PHA) and operator interface 404. The operator interface 404 is shown for completeness and includes a memory controller/interface 406, a dedicated histogram memory 408 and a generic computer 410. The pulse height analyzer 402 includes an analog front end 412 and a digital section 414.

For the purpose of the detailed description, the detector 400 is a scintillation crystal (not shown) coupled to a photomultiplier (not shown, PMT).

The analog front end 412 includes preamplifier 416, integrator 418, ADC 420, limit sensor 422, Integrator Reset Controller 424 and DAC 426. In a traditional acquisition system, the preamplifier 416 will convert the current signal from the anode or, in some cases, from one of the last dynodes of the PMT of the detector 400, to a voltage signal and may also perform some integration to slow down the signal and make it suitable for a subsequent shaping amplifier. In the system of the present disclosure, the preamplifier 416 is a simple current-to-voltage converter, and may not include a shaping circuit (some level of filtering can be used for high frequency noise rejection and/or impedance matching and equalization).

The analog integrator input summation node is driven by preamplifier 416 output (SIG) and Auxiliary DAC 426 (ARST). The ADC 420 samples the composite signal from the integrator 418:

$$AOUT = \int (SIG + ARST) dt \qquad \text{eq. 3}$$

at regular intervals. The time distance between samples is chosen so that it is shorter than, or at least comparable in length to, the time decay constant(s) of the scintillation material to allow several samples to cover the length of the light pulse. Since the detector signal present on SIG is uni-polar, the integrator may be periodically reset to prevent overflow. This reset function is performed by the Integrator Reset Controller 424 (IRC) which generates reset signal (ARST=DAC(DRST)) through the auxiliary DAC 426 to keep integrator output headroom within acceptable range. While the ADC 420 output alone can be used to monitor the integrator 418, a limit sensor 422 (preferably implemented with a threshold crossing comparator) is preferable because high resolution ADCs have high latencies, leading to an unacceptable reaction time. In some applications, the high resolution ADC 420 can complement the limit sensor's 422 low resolution, should more sophisticated predictive algorithms be implemented. Unlike the detector signal, which has no time relationship with the acquisition clock, the reset signal is updated synchronously with the ADC 420 sampling clock and digitized without aliasing effects. The system response to such signal is unambiguous, repeatable and can be cancelled with appropriate calibration.

Figure 5:
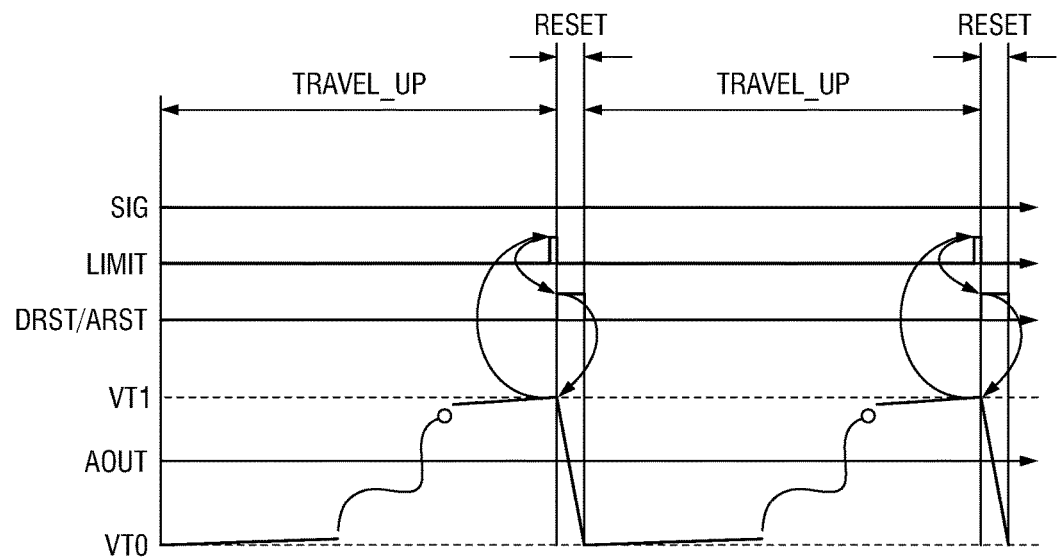
FIG. 5 shows an illustrative response for the system of FIG. 4 for a "cold" cycle in accordance with embodiments of the present disclosure.
Figure 6:
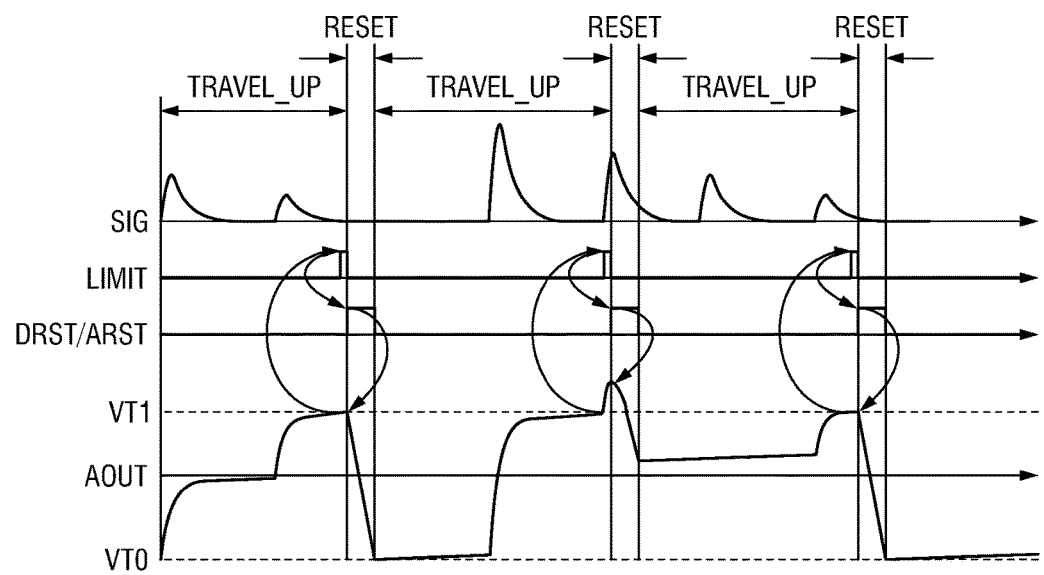
FIG. 6 shows an illustrative response for the system of FIG. 4 for a "hot" cycle in accordance with embodiments of the present disclosure.

The implementation can be simplified by using a single bit DAC for DAC 426. FIGS. 5 and 6 respectively show the response of such a system: Integrator output (AOUT) is initially at VT0. DRST is cleared and DAC 426 outputs a small negative voltage (−tup). In the absence of Pulse Events (Cold cycle, FIG. 5), SIG=0 and V2 ($=-\int tup \times dt$) slowly sweeps up at a linear rate (travel-up interval). Upon AOUT reaching VT1, limit sensor 422 output (LIMIT) is set, causing the IRC 424 to activate DRST. DAC 426 output is then set to a positive voltage (tdn) and AOUT sweeps back toward VT0 to begin the next cycle. The integration of incoming pulse events increases the AOUT rate of climb, shortening travel-up intervals as additional reset cycles are initiated to account for the additional charge collection (see hot cycle, FIG. 6).

Figure 7:
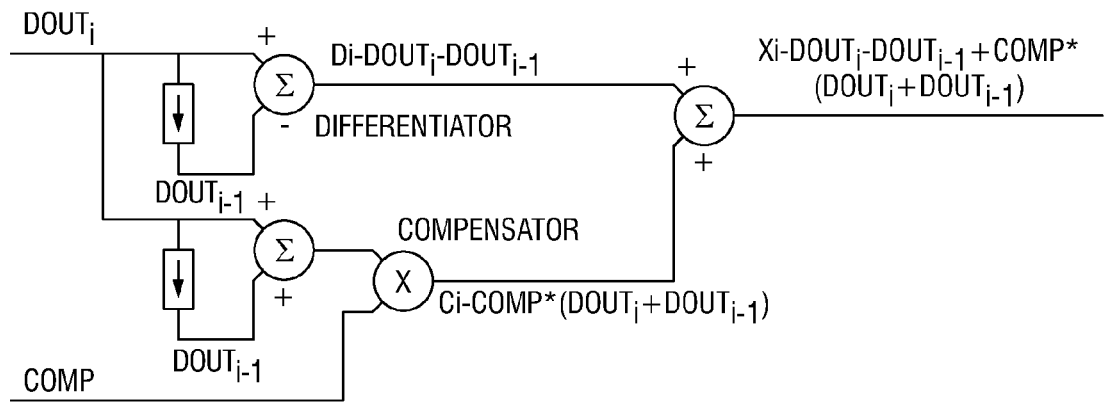
FIG. 7 shows a circuit block diagram for the compensated differentiator of the digital section of the system in FIG. 4.

The Digital section 414 includes compensated differentiator 428, Baseline estimator 430 (BSE), summing node 432, Pulse processor 434, and histogram writing logic 436. The compensated differentiator 428 recreates a digitized version of analog integrator composite input ($X_i = \{SIG + ARST\}$) and compensates for integrating capacitor self discharge. This effect, caused by the integrating capacitor leakage current (and more importantly integrating amplifier non finite gain) is well documented and causes integrator output step response to sag proportionally to the voltage applied across the integrating capacitor. The compensator of the compensated differentiator 428 (shown in greater detail in FIG. 7) injects a signal proportional to the integrator output voltage to cancel this effect.

Figure 8:
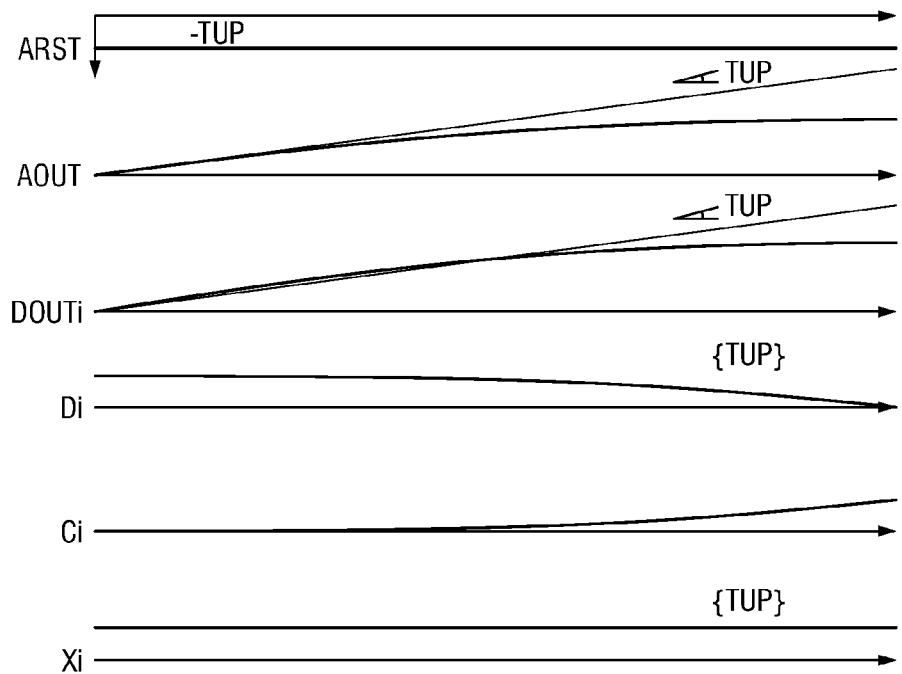
FIG. 8 shows a timing diagram for the integrator travel-up period during a cold cycle starting at time=0, ARST is set to −tup.

The timing diagram shown in FIG. 8 depicts the integrator travel up period during a cold cycle: starting at time=0, ARST is set to −tup and integrator output swings up at a low rate. The effect of capacitor discharge causes integrator output (AOUT) and its digital representation (DOUT) to slowly diverge from the linear trend shown in gray) while differentiated output ($D_i$), sweeps down. The compensator 700 adds a fraction of its input ($C_i$) to compensate for this effect and return ($X_i$) to $X_i=\{tup\}$. As discussed below, the compensator 700 action can be automatically adjusted by the BSE 430. For the purpose of clarity, FIG. 8 shows integrator response starting at AOUT=0, with considerable magnification.

Figure 9:
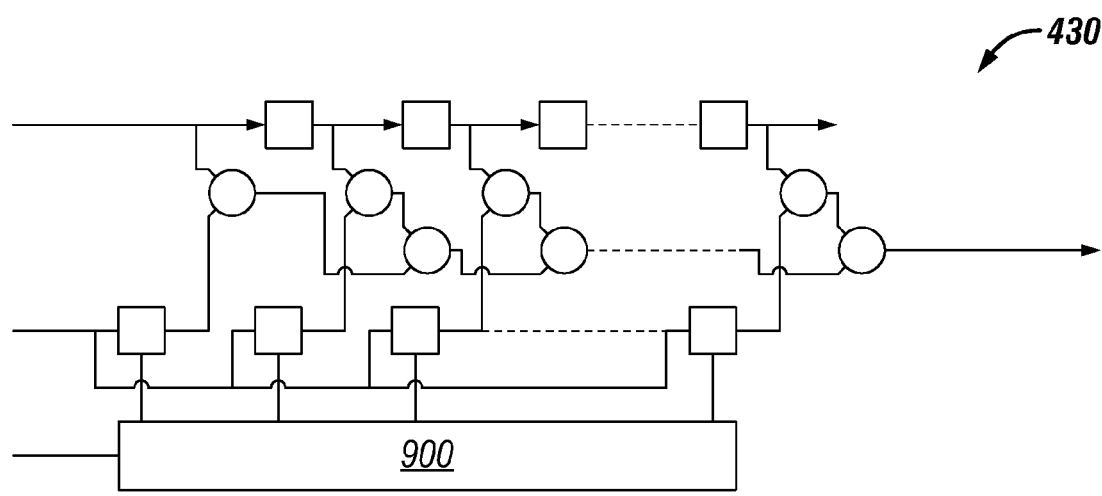
FIG. 9 shows a circuit block diagram for the BSE of the digital section of the system in FIG. 4.

The purpose of the BSE 430 is to estimate the system response to the reset signal (<$DRST_i$>) which can then be subtracted from differentiated signal ($X_i$) to re-create a digital copy of the detector signal ($Y_i$=<SIG>). As shown in the block diagram of the circuit for the BSE 430 in FIG. 9, the BSE 430 is driven by both ADC 420 and IRC 424. It includes a set of registers/accumulators ($RA_1 \ldots RA_n$) configured as a Finite Impulse response filters (FIR) and a coefficients storage array ($RB_1 \ldots RB_n$). Two operating modes are defined as: CALIBRATE and ACQUIRE.

In CALIBRATE mode, the IRC 424 sets the CAL line while sending an impulse signal on DRST (DRST0=tdn, RSTi=tup otherwise). Upon CAL activation, the sequencer 900 activates lines ($ena_1 \ldots ena_n$) in succession, causing the impulse response of the acquisition system ($R_i$) to be stored into register $RB_1 \ldots RB_n$, respectively. The length of the sequence (n) is set to accommodate response time duration and system resolution.

In ACQUIRE mode, the FIR filter convolves the IRC 424 signal ($DRST_i$) with the impulse response of the system. Its output $$B_i = \sum_{k=0}^{n-1} (R_k \cdot DRST_{i-k})$$

represents an estimate of the system response to the IRC 424 signal <$DRST_i$> and can be subtracted from the compensated differentiator 428 output to recreate a digital representation of the detector signal (SIG). Note that, as mentioned before, the correction signal is not affected by aliasing since it is synchronous with the acquisition clock (not shown) within clock and ADC window aperture jitters, and is a repeatable representation of the analog reset signal.

$$Y_i = X_i - B_i = \{Sig_i + DAC(DRST_i)\} - <DAC(DRST_i)> \cong \{SIG_i\} \quad \text{eq. 4}$$

Figure 10:
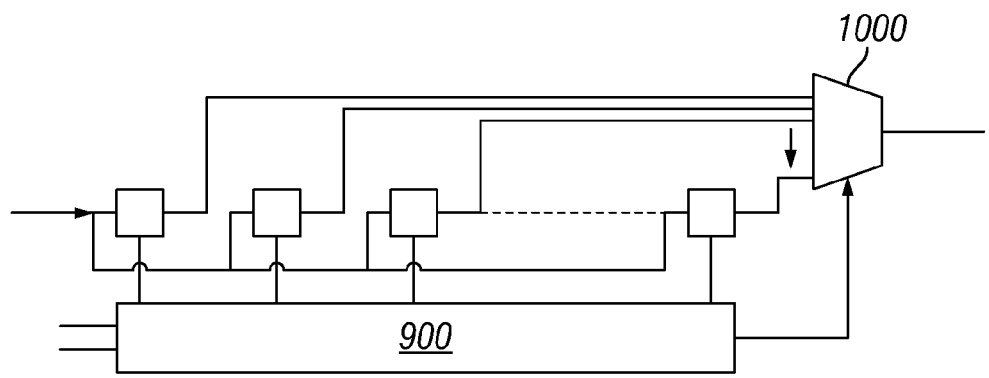
FIG. 10 shows a circuit block diagram of a simplified BSE of the digital section of the system in FIG. 4.

Simplification is possible by using a unique pattern to reset the integrator (during both calibration and acquisition phases) and forcing successive integrator resets to be separated by at least the length of the recorded impulse response (so successive responses do not overlap in time). Such an implementation is shown in the simplified BSE shown in FIG. 10.

Calibration mode is unchanged and the system impulse is stored into $RB_1 \ldots RB_n$ as previously. During acquisition, however, since the same pattern is sent each time the integrator is being reset and two successive patterns do not overlap, the FIR filter is no longer necessary and is replaced with a multiplexer 1000, controlled by the sequencer 900, as shown in the circuit block diagram of FIG. 9. Upon resetting the integrator, the IRC 424 activates the RESET line, and the sequencer 900 sets the multiplexer 1000 to present the contents of $RB_1 \ldots RB_n$ registers in succession until the last register is selected. Since the last sample represents the final state of the impulse response, the final state can be maintained until the next reset pulse. The BSE 430 can be seen as "replaying" the impulse response, which can be subtracted from the compensated differentiator output to recreate the original detector signal.

Figure 11:
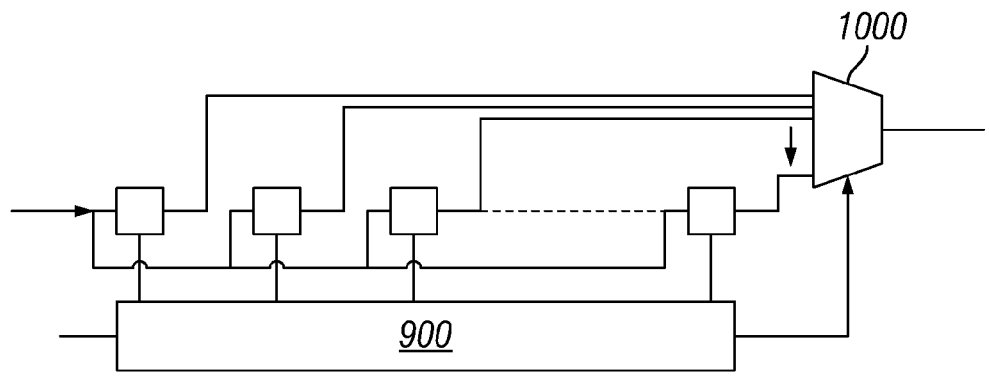
FIG. 11 shows a circuit block diagram of a Baseline restorer with automatic calibration.

While calibration can be carried out during dedicated periods with the detector 400 disabled, it is often preferable to operate the system in a continuous fashion. FIG. 11 shows another embodiment of the BSE for automatic calibration while the detector is substantially continuously operable. Storage registers are replaced by gated baseline restorers (Adaptive threshold baseline restorer, ATBR1, 2, and 3). Each ATBR operates at a specific time during the integrator cycle (as selected by the sequencer 900) and produces a baseline corrected signal ($Y_i$) while maintaining an estimation of the baseline ($B_i$) without the need for a separate calibration phase. The summation node is eliminated, since baseline corrected samples ($Y_i$) are directly produced at the output of the multiplexer.

Figure 12A:
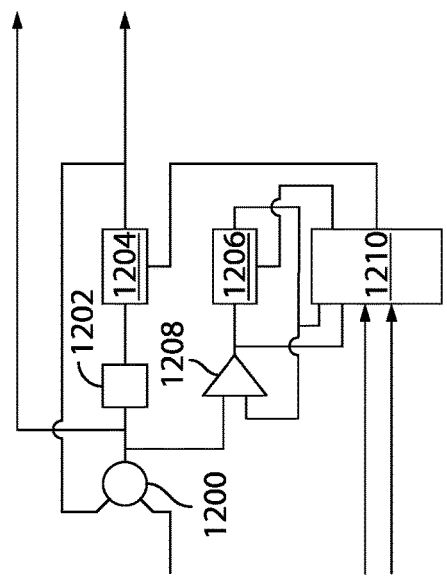
FIG. 12A shows an adaptive threshold baseline restorer and FIG. 12B shows a timing diagram for the adaptive threshold baseline restorer.
Figure 12B:
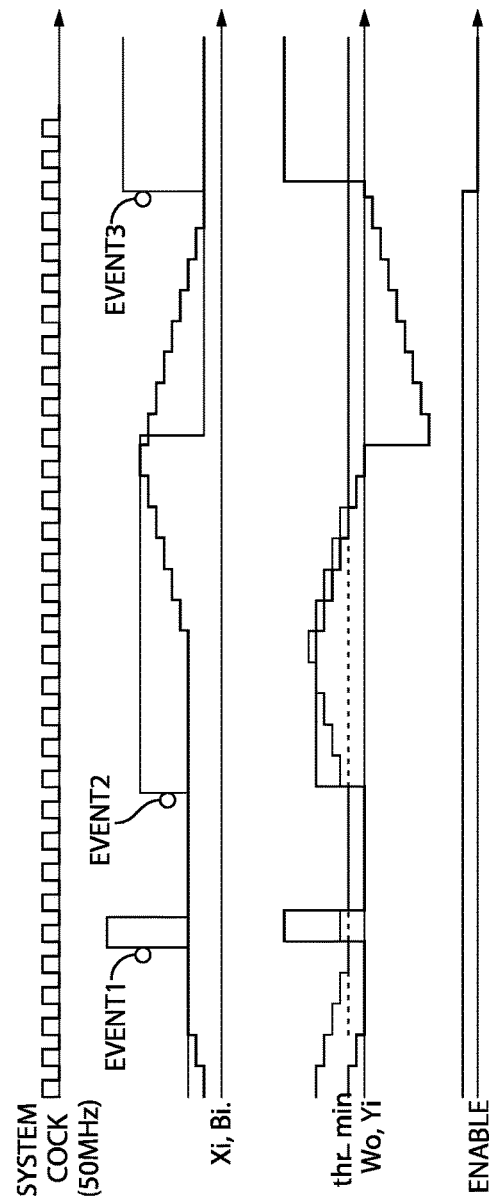

The ATBR circuit shown in FIG. 12 is a digital equivalent of the analog baseline restoration used in traditional shaping amplifiers connected to pulse height analyzers. It includes a summing node 1200, a sign indicator 1202, two gated up/down counters (CNT1 1204, CNT2 1206), a Low Level Discriminator 1208 (LLD) and associated support logic 1210. To facilitate the description, the following describes a single ATBR operating continuously. Because ATBRs actually operate in a discontinuous fashion as each covers a specific part of the integrator cycle. Operation is as follows:

CNT1 1204 maintains an estimate of the signal baseline ($B_i$), and is enabled to track input signal $X_i$ (counts up if above estimated baseline, counts down otherwise), as long as output signal ($Y_i$) is below low level discriminator 1208 threshold (thrk).

CNT2 1206 output sets LLD 1208 threshold (thrk) and is enabled to track output signal ($Y_i$) (counts up if $S_i$ is above threshold, counts down otherwise) as long as its remains above thr_min to prevent latch up situations, even in case of large baseline estimation errors.

The timing diagram at the bottom of FIG. 12 provides a typical example:

Initial Conditions—

Initially, baseline estimation ($B_i$) is below input signal, while output signal is below LLD 1208 threshold. Since the ATBR is enabled (enable is high), CNT1 1204 is allowed to count up until it tracks $Z_i$, while LLD 1208 threshold is decremented down to thr_min.

Event 1—

The first event consists of a short duration positive pulse. In this case, CNT1 1204 holds the estimated baseline, while CNT2 1206 increases LLD 1208 threshold by 1. Baseline corrected pulse is transmitted to the output without baseline update.

Event 2—

The ATBR reacts identically at the beginning of event 2. However, since $S_i$ remains above baseline, CNT2 1206 is allowed to count up until thri catches up with the input signal, allowing CNT1 1204 to start updating the baseline while thri starts ramping down to thr_min.

Event 3—

Since enable is deactivated, all baseline and threshold updates are disabled.

Thr_min is set (typically at noise peak value), allowing the baseline to track the noise without bias. Although the type of circuit shown in FIG. 12 has a slow response time, it is well adapted to track slowly varying environmental conditions (such as temperature).

Figure 13:
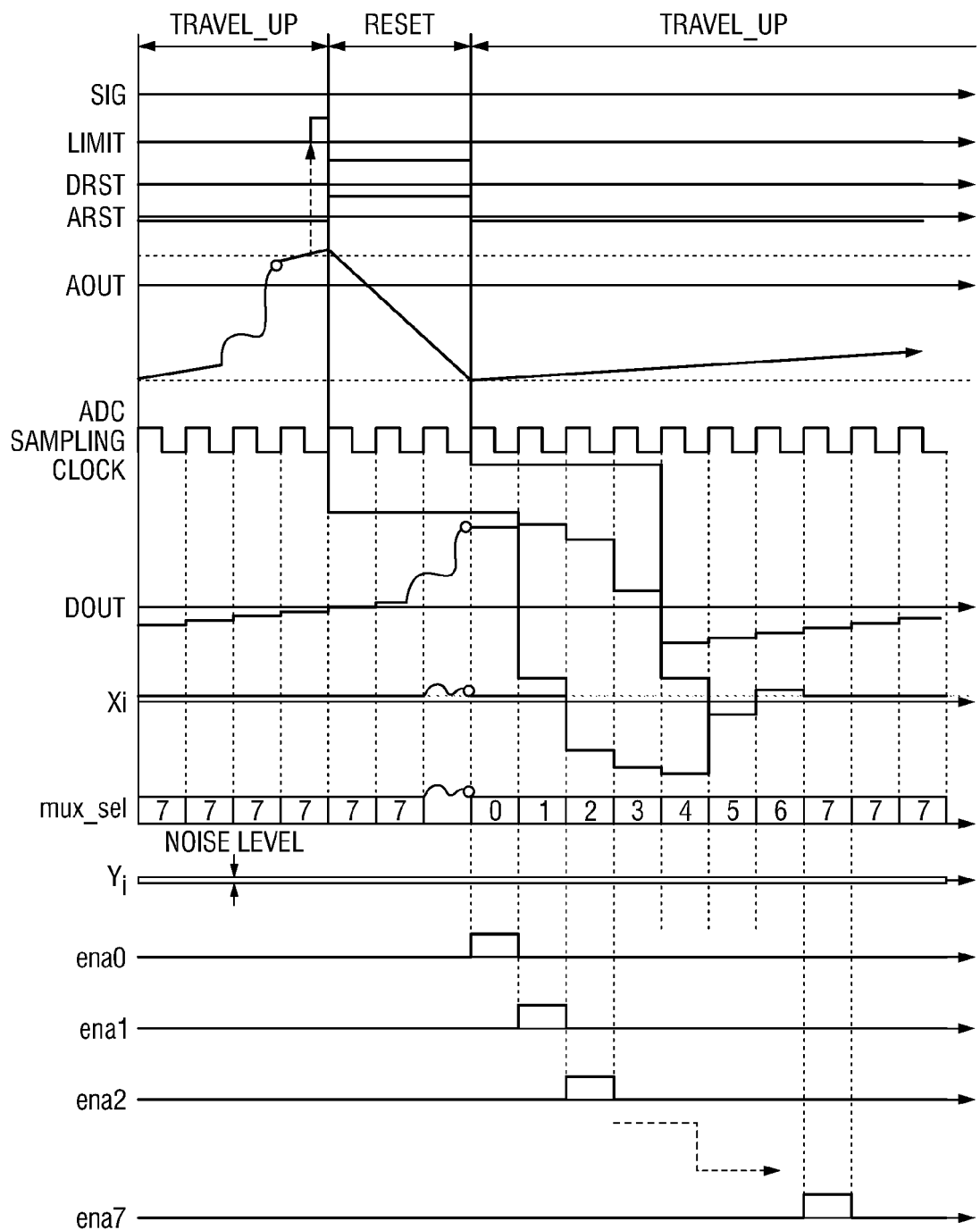
FIG. 13 shows a timing diagram for a modified baseline restorer in system operation (cold Cycle).
Figure 14:
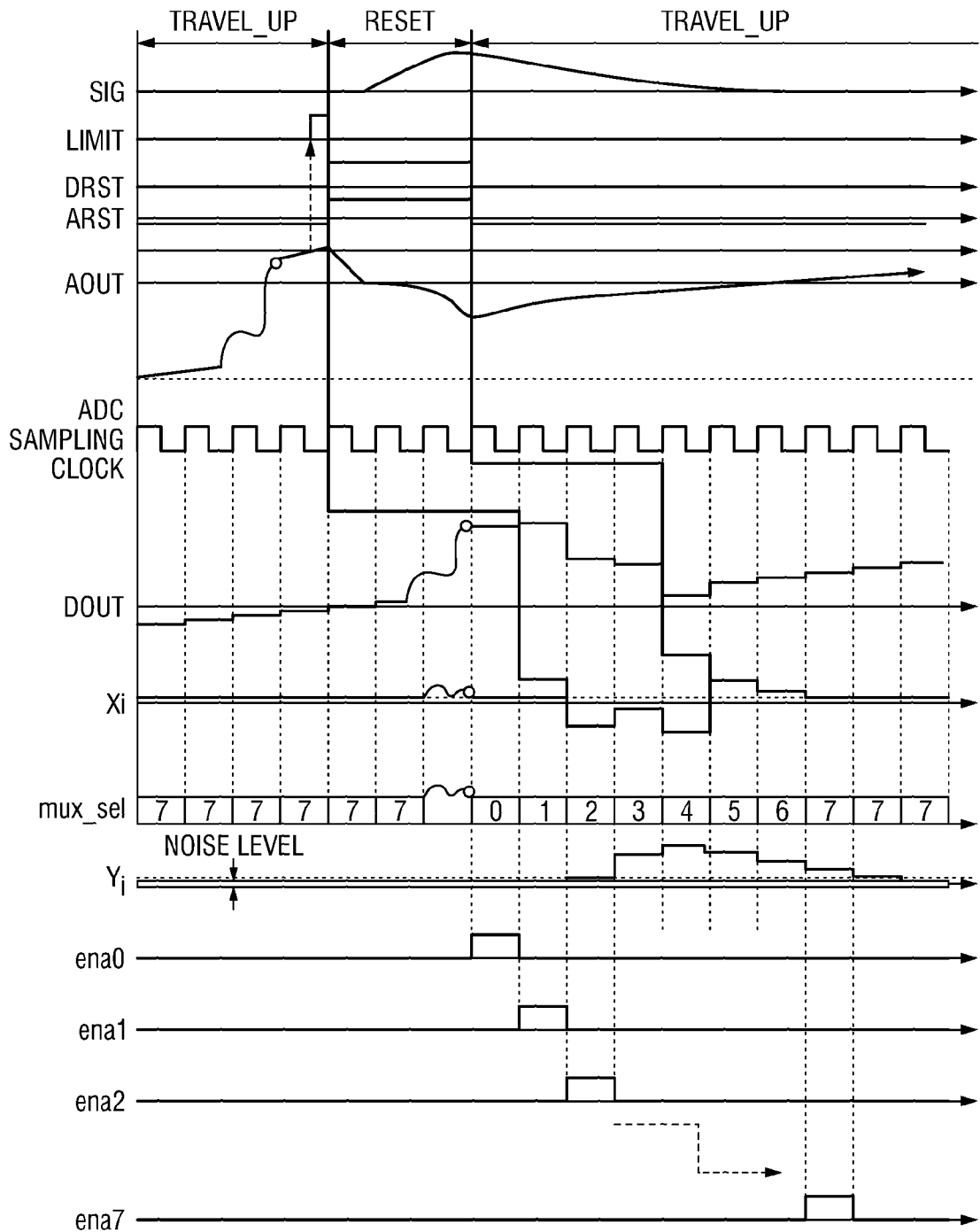
FIG. 14 shows a timing diagram for a modified baseline restorer in system operation (hot Cycle).

Timing diagrams of a modified baseline restorer are given in FIG. 13 and FIG. 14 respectively. Integrator output (AOUT) is initially at VT0. DRST is cleared and DAC 426 outputs a small negative voltage (tup). In the absence of Pulse Events (Cold cycle, FIG. 13), SIG=0 and V2 (=−∫tup× dt) slowly sweeps up at a linear rate (travel-up interval). ADC 420 output tracks the integrator with its latency delay (4 clock periods in this example) while compensated differentiator output ($X_i$) remains equal to {tup}. Multiplexer control (mux_sel) is then set to 7 selecting ATBR7. Upon AOUT reaching VT1, limit sensor output (LIMIT) is set, causing the IRC 424 to activate DRST for three acquisition clock periods. DAC 426 output ARST is then set to a large positive voltage (tdn) and AOUT sweeps back toward VT0. The reset cycle begins one sample before the ADC 420 actually delivers its first reset sample (three samples after DRST activation).

As described below, this allows capturing the differentiator output at the top of the travel up period (just before reset) to automatically adjust compensator setting. The reset cycle consists of selecting/enabling (for baseline tracking) ATBR to ATBR7 in succession through lines mux_sel and ena(0 . . . 7). The cycle ends with ATBR7 selected, until the next reset cycle. Operation is the same in the presence of pulses, as shown in FIG. 14.

Although selected during the entire travel up period, ATBR7 is only enabled during one clock cycle.

Amplitude histogram of corrected outputs ($Y_i$) can be used for quality control and system noise monitoring.

The method described above has been simulated and proves possible operation for sustained count rates up to 1% of the acquisition frequency (500 kcps in our case). This works well for tools using pulsed nuclear radiation sources since calibration can be enabled exclusively during low count rate periods (burst-off background, i.e., a period of several ms, during which there is no neutron generation).

Operation at sustained higher count rates will show a progressive baseline upshift (restored signal downshift), as more low energy pulses (and trailing ends of higher energy pulses) are not rejected by the gated restorers. The paragraphs below show two possible methods devised to minimize this effect:

ATBRs are modified to output and latch baseline update "freeze" line (bfri, cleared a few sample before the beginning of each reset cycle and set whenever a type 1 event has occurred, see FIG. 12). Baseline estimate updates are delayed and performed upon completion of the reset cycle only if all bfri are cleared (only if no pulse event was detected just before and during the entire reset cycle).

A software controlled method using reset amplitude histograms and compensated for this effect can be used in addition.

Should sustained high count rate be expected (or software based control be unpractical), dedicated calibration may be warranted. In this case, instead of disabling the detector (which may require shutting down detector supply and adding a start up period), the integrator summation node can include an electrically activated router disabling its detector input during calibration to minimize associated dead time.

Figure 15:
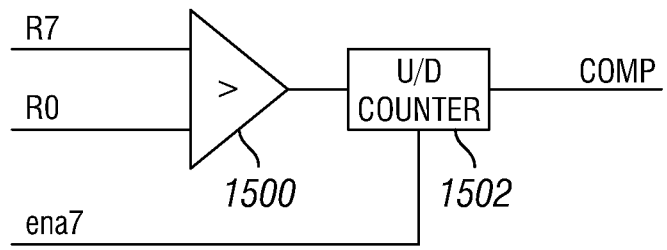
FIG. 15 shows a circuit block diagram for an integrator compensation optimizer.

Referring back to FIG. 8, optimal integrator compensation is reached when baseline rates of climb at beginning and end of the travel up period are matched. Since both are recorded by the BSE 430 (in R7 and R0, respectively) a simple control algorithm can be designed to optimize compensation setting (COMP). The implementation shown in FIG. 15 includes a comparator 1500 and an up/down counter 1502. The counter 1502 is enabled at the end of each reset cycle, following R7 update (counts up if R7>R0, counts down if R7<R0) and adjusts compensator gain (COMP) optimally for R0=R7.

Figure 16:
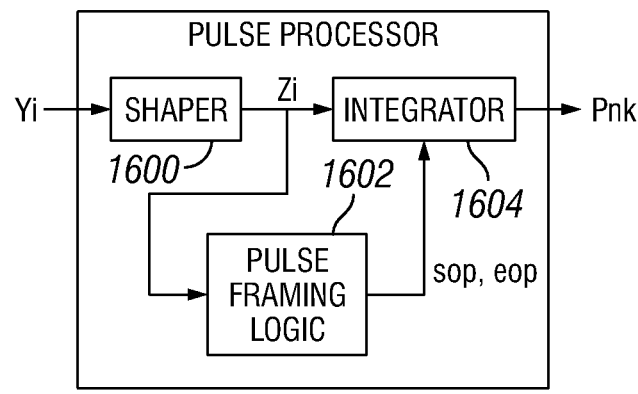
FIG. 16 shows a circuit block diagram for the pulse processor of FIG. 4.

The pulse processor 434 collects digitized nuclear pulses supplied by the baseline restorer. Its purpose is to evaluate the energy deposited in the detector during the events that created them (to be transferred to the MCA histogram acquisition memory) and mark the Time-Of-Arrival of the detected pulses (to be transferred to the MCS histogram acquisition memory). As shown in FIG. 16, the pulse processor 434 includes pulse shaper 1600, pulse framing logic 1602 and integrator 1604.

Figure 17:
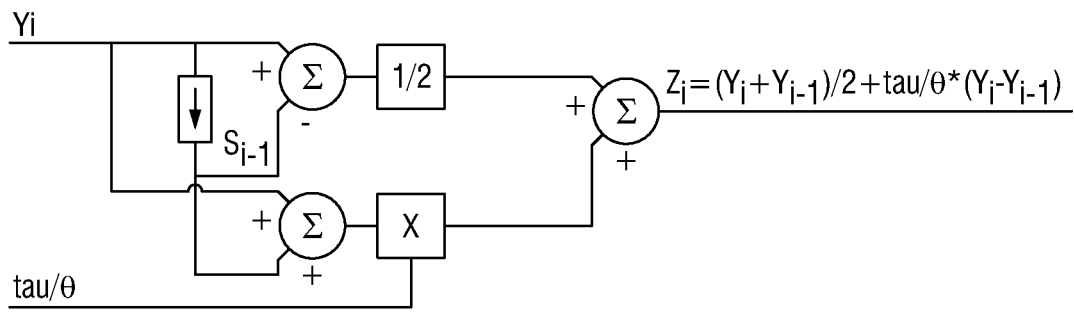
FIG. 17 shows a circuit block diagram for the pulse shaper of FIG. 4.

The pulse shaper 1600 is the digital equivalent of the pole zero network used in traditional shaping amplifiers connected to pulse height analyzers. It is a digital filter that speeds up the detector signal return to baseline for improved throughput and lower inter-symbol dependency. As shown in FIG. 17, the pulse shaper 1600 is implemented with a single tap FIR filter with a transfer function of the form:

$$Z_i = \frac{1}{2}(Y_i + Y_{i-1}) + \frac{\tau}{\theta}(Y_i + Y_{i-1}) \quad \text{eq. 5}$$

$$\theta = \frac{1}{SamplingFrequency}$$

Shaping time constant (τ) allows adjusting the processed pulse return to baseline, ranging from 0 (no action) to the pulse decay time (optimal compensation). Higher values are not desirable, due to the resulting undershoot. The value of τ can be automatically adjusted for a given pulse processing time. FIGS. 19A-D shows examples of a typical nuclear detector signal (22.5 ns time constant) processed with different τ settings. The highest value of τ creates undershoot (bottom panel in FIG. 19D).

Figure 18:
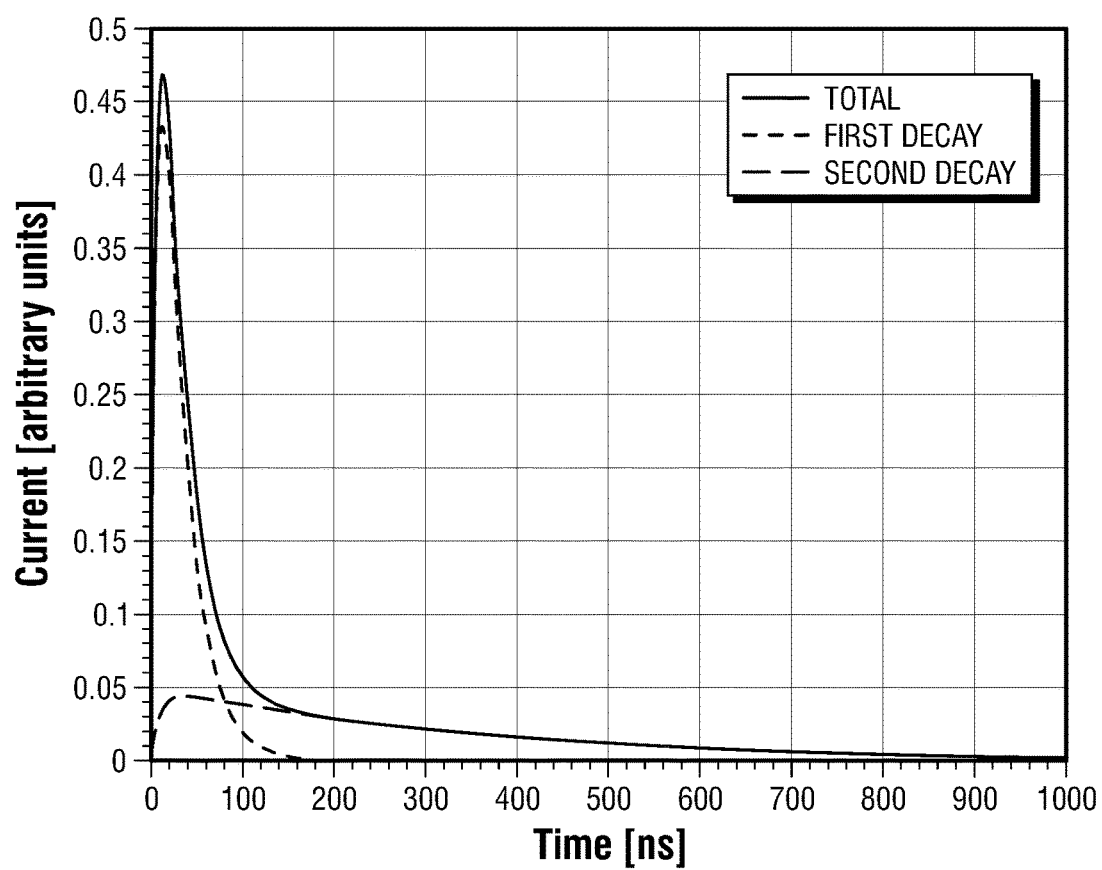
FIG. 18 shows an example graph of a scintillation decay with two time constants.
Figure 19A:
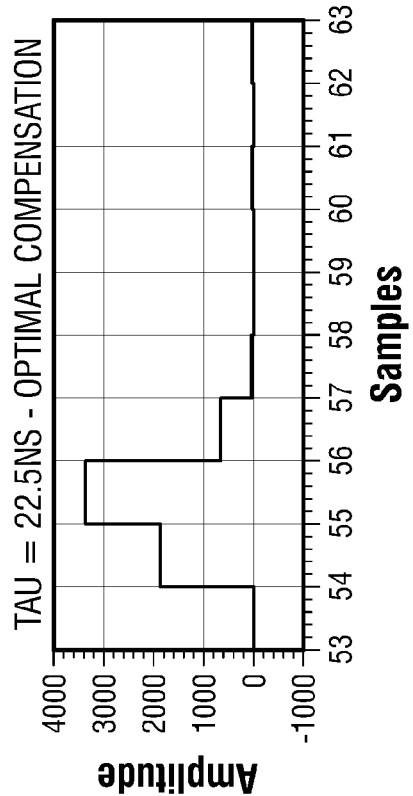
FIG. 19A-D show illustrative plots for shaper output. Specifically.
Figure 19C:
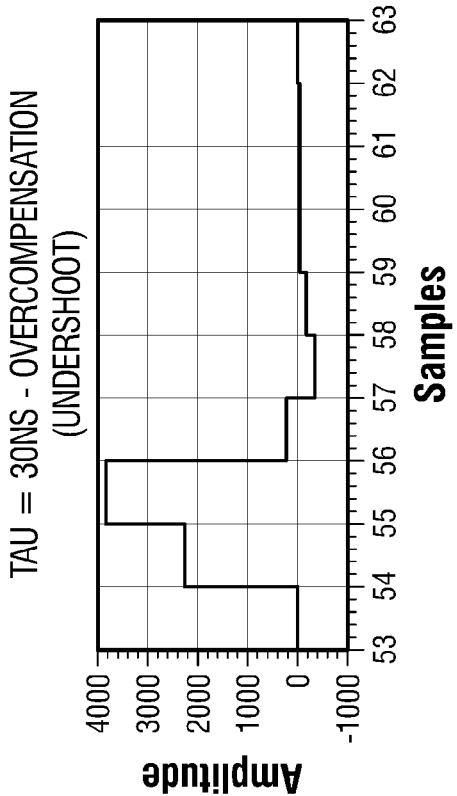
Figure 19B:
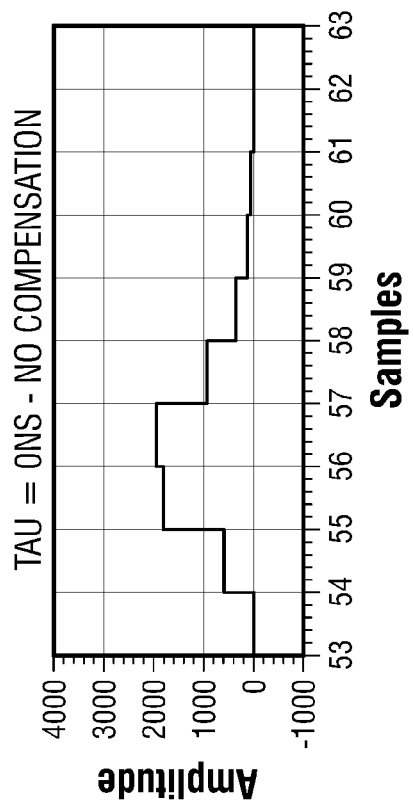
Figure 19D:
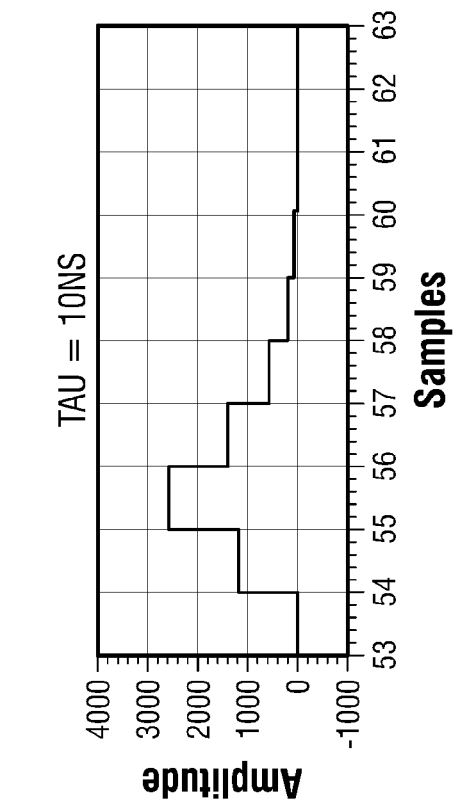

The implementation described here corrects for one more scintillator time constant and includes two additional optional filter blocks. The additional optional filters are not used, though, since the effect of a second time constant is negligible in this particular case. An example of a scintillation decay with two time constants is shown in FIG. 18.

Figure 20:
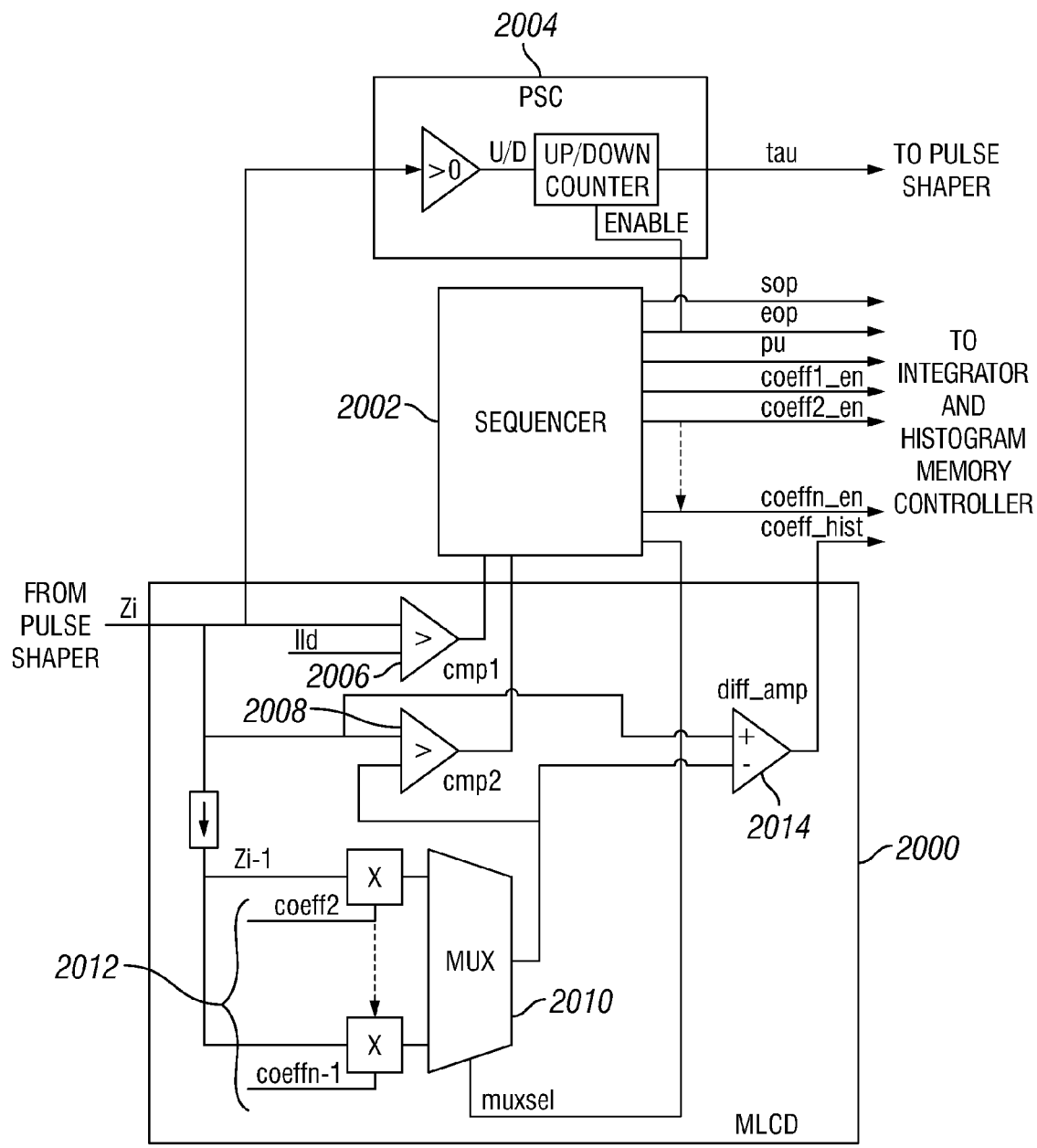
FIG. 20 shows a circuit block diagram for the pulse framing logic of FIG. 4.

The pulse framing logic 1602 has three functions: (1) Mark pulse boundaries, (2) Detect pulse pile-ups and (3) Implement automatic pulse shaping. A simplified block diagram is shown in FIG. 20, including Multi-Level Crossing Detector 2000 (MLCD), sequencer 2002, and Pulse Shaping Controller 2004 (PSC).

The MLCD 2000 includes two comparators (CMP1 2006, CMP2 2008), multiplexer 2010 (MUX), constant multipliers array 2012 (coeff_i) and difference amplifier 2014 (diff_amp). Each sample $Z_i$ is compared to a preset level (lld, CMP1) and to its previous value ($Z_{i-1}$) multiplied by a coefficient selected through multiplexer 2010 (coeff_i, CMP2). Amplifier diff_amp computes the difference $Z_i - Z_{i-1}*coeff\_i$ which will be used to optimize the values of coeff_i.

The sequencer generates three groups of signals: MLCD multiplexer control, framing signals and histogram acquisition strobes. Three framing signals are defined (sop, eop, pu), sop is activated at the beginning of a pulse event, while eop is activated when the signal returns to baseline level. Should one (or more) pulses be detected before the signal has returned to baseline, sop is activated again (at each occurrence) and pile up indicator (pu) is set until eop is activated. This allows registering every pulse event time of arrival with maximal resolution (for MCS spectra) while preventing pulses accumulated during pileups to be recorded in the MCA spectra.

Figure 21:
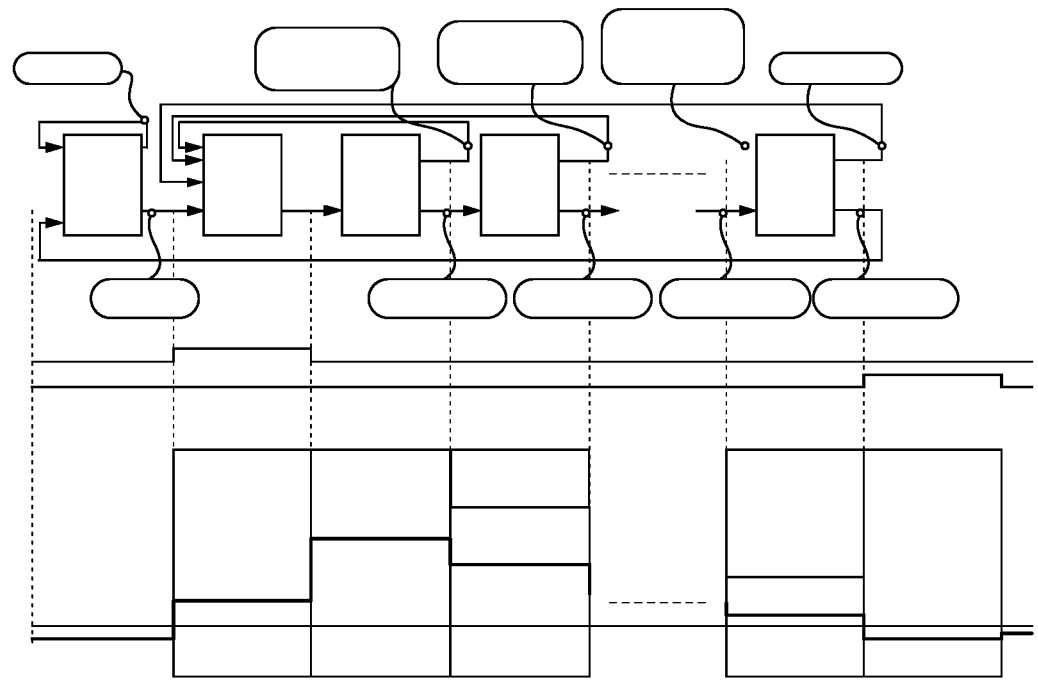
FIG. 21 shows a state diagram for frame framing logic.

The sequencer 2002 implements an n-state machine, the state of which is updated at every sampling clock period (see state diagram in FIG. 21). Initial state is idle (state_0), switch to state_1 occurs on the first sample found above low level detection threshold (lld) and sop is asserted for one sampling clock period. The state machine then assumes state_2 to state_n in succession, as long as no pileups are detected, then resumes idle state. Upon returning to idle, pf_eop is asserted for one sampling clock period. Pile-up detection is active when leaving any states after state_2 and is performed in the MLCD 2000: each incoming sample (Zi) is compared to both lld and a threshold (threshi) proportional to the value of the previous sample (thresh$_i$=coeff_i*$Z_{i-1}$). Should a sample be found above both this threshold and lld (samples found below lld are not checked to prevent false triggering caused by noise), the sequencer 2002 returns to state_1 while pu is asserted. pu will remain active until the state machine is allowed to reach state_n without further pile up detection (it will return to state_1 otherwise). Pileups are handled like regular pulse events (since the sequencer 2002 returns to state_1, sop is activated for every detected pile up). Each detected pileup requires an additional n clock periods processing time.

As seen above, the pile up rejection mechanism operates by creating a reference curve (threshi=coeff*Xi−1 and verifying that the pulse (Xi) unwinds below this curve on a sample to sample basis. This feature can be extended both in scope and application.

The technique can be applied to discriminating/separating pulses created by different types of interaction within the detector and/or different kind of particles being detected (for example crystals such as Elpasolites generate differently shaped pulses depending of the type of particle detected (neutron or gamma ray)). In addition to obtaining a signal that indicates the total energy deposited in the detector, the pulse shape can be determined and the information used to distinguish interactions of different particles with the scintillator (pulse shape discrimination).

The expansion of threshi can be generalized to a polynomial combination of previous samples (such as threshi=a0+sum(ak*Xi−k), k=1 ... m,). The separation criterion can be extended to include negative limits or bounds.

The pulse shaping controller (referring again to FIG. 16) includes an up/down counter updating shaping time constant (tau τ) for signal return to zero, n samples after beginning of the pulse (up for sample n above zero to increase acceleration, down otherwise if undershoot).

A programmable number of processed samples (n) provides for automatically adjusting pulse return to baseline (and system resolution/throughput). In our application using a LaBr scintillation detector (time constant=25 ns) and a 50 MHz sampling frequency, n can be adjusted between 4, (τ=25 ns, at the onset of undershooting) to about 12 (simulation only, τ=0, when the tail of a non accelerated pulse drops below noise level).

Pulse heights are registered, following eop activation with pu=0 (piled up pulse heights are not recorded). MCS times of arrival are registered each time sop is found active (both regular pulse events and pile-up). In order to account for all pulses, pileups are counted: 1) Following sop activation with pu=1 (each time a pile up is detected), and 2) Following eop activation with pu=1 (to include the first pulse). Maximum MCA throughput (regular pulse height) is one pulse event every n+1 sampling clock periods.

Resolution of pile-up (and MCS delivery) is 2 sampling clock periods. While system resolution and throughput are directly controlled by the value of n, pileup rejection for MCS application is only marginally affected and remains equal to 2 sampling periods over the range. The pile up rejection scheme is non-paralysable and provides for an easy modeling of pileup effects.

The pulse framing logic could be extended to use additional signal processing on pile up pulses and deconvolve such pulses at least for the case of a pile up of two pulses to obtain the pulse height of one or both of the pulses involved in the pulse pile up.

Figure 22:
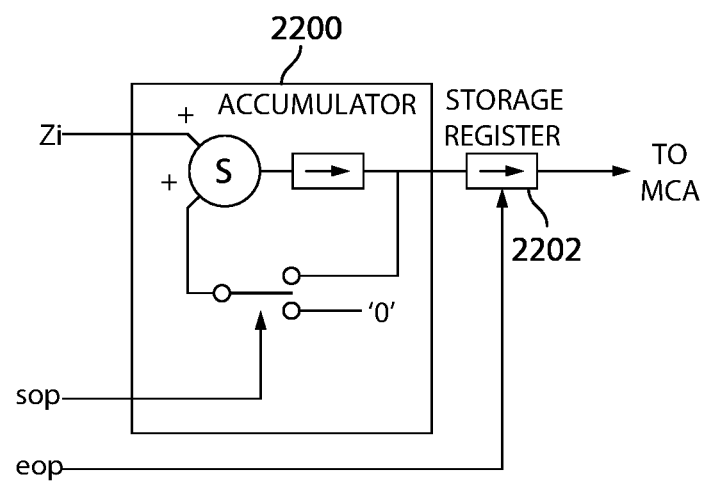
FIG. 22 shows an integrator in accordance with embodiments of the present disclosure.

The integrator shown in FIG. 22 includes an accumulator 2200 and a storage register 2202. The accumulator 2200 is cleared at the beginning of every pulse (sop active) while its accumulated result is held in a storage register 2202 for delivery to the MCA at the end of every pulse. The accumulated result contains the sum of n+1 pulse samples starting one sample before lld crossing and ending n samples later when the signal returns to zero. Delivery to MCA is disabled should both eop and pu flags be active simultaneously.

The present disclosure shows an elegant and flexible way of acquiring pulse height spectra and multiple ancillary parameters in a very high throughput environment. The method is not limited to the acquisition of a single spectrum (energy or time). Rather, through proper tagging of the pulses, the energy spectrum (total charge) can be associated with different time bins in a pulsing scheme, while the time spectra can be associated with preselected energy windows. In addition, if applied in the Oilfield, the energy spectra and/or the MCS spectra etc can be associated with a tool azimuth. This allows the acquisition of azimuthal information.

The preferred embodiment assumes that the analog section of the system is DC-coupled. If the system were AC coupled, the DC-signal could be restored in the analog section. Alternatively, the signal processing of the integrated signal in the compensated differentiator would need to be changed. The use of AC-coupling by means of a transformer, capacitor or a combination thereof may be required if the original electric pulse is superimposed on an elevated DC voltage, as would be the case of a PMT operated with positive HV; i.e. the cathode would be grounded and the anode would be at a high voltage of several 100 V. Similar considerations would apply to a gas proportional counter operated with a positive high voltage on the anode wire.

Figure 23:
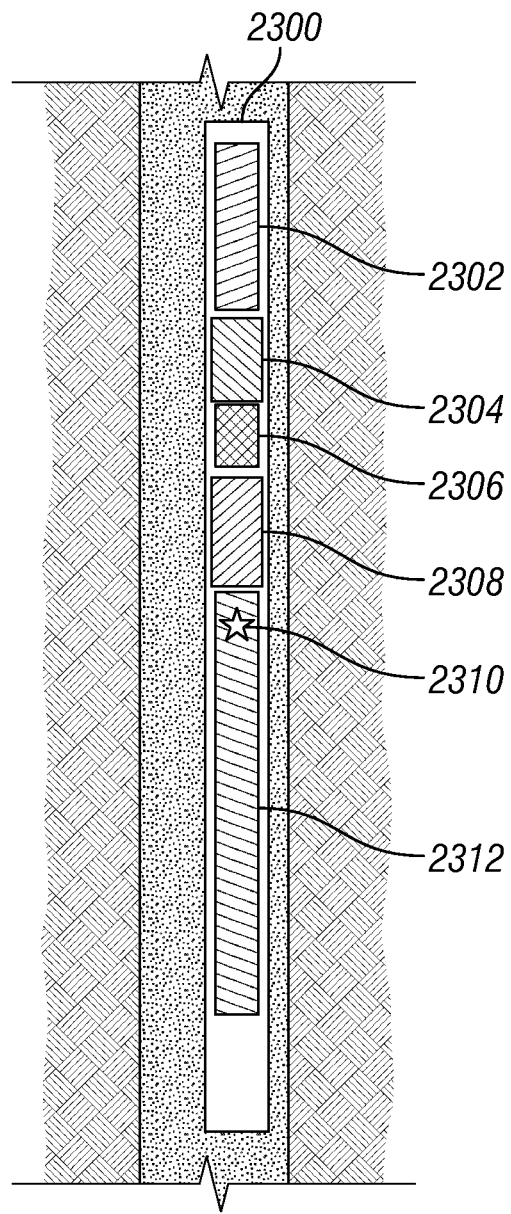
FIG. 23 shows a side view of a downhole logging tool equipped with a pulsed neutron generator and a gamma-ray detector consisting of a LaBr detector coupled to a spectroscopy photomultiplier in accordance with embodiments of the present disclosure.

The method of the disclosure has been used to acquire gamma-ray spectra with a downhole logging tool. The tool shown in FIG. 23 includes a tool housing 2300 that encloses a pulse height analyzer 2302, a photomultiplier 2304 (PMT), a scintillator 2306, shielding 2308, a neutron generator 2312, with the center of neutron emission 2310). The photomultiplier 2304 and scintillator 2306 together make up a gamma-ray detector consisting of a LaBr detector in a preferred embodiment. The neutron generator 2312 was pulsed and data were acquired during the neutron burst and during several time intervals after the burst (see e.g. U.S.

Pat. No. 6,703,606). The count rates during the burst are typically in excess of 1 MHz in this application.

Figure 24:
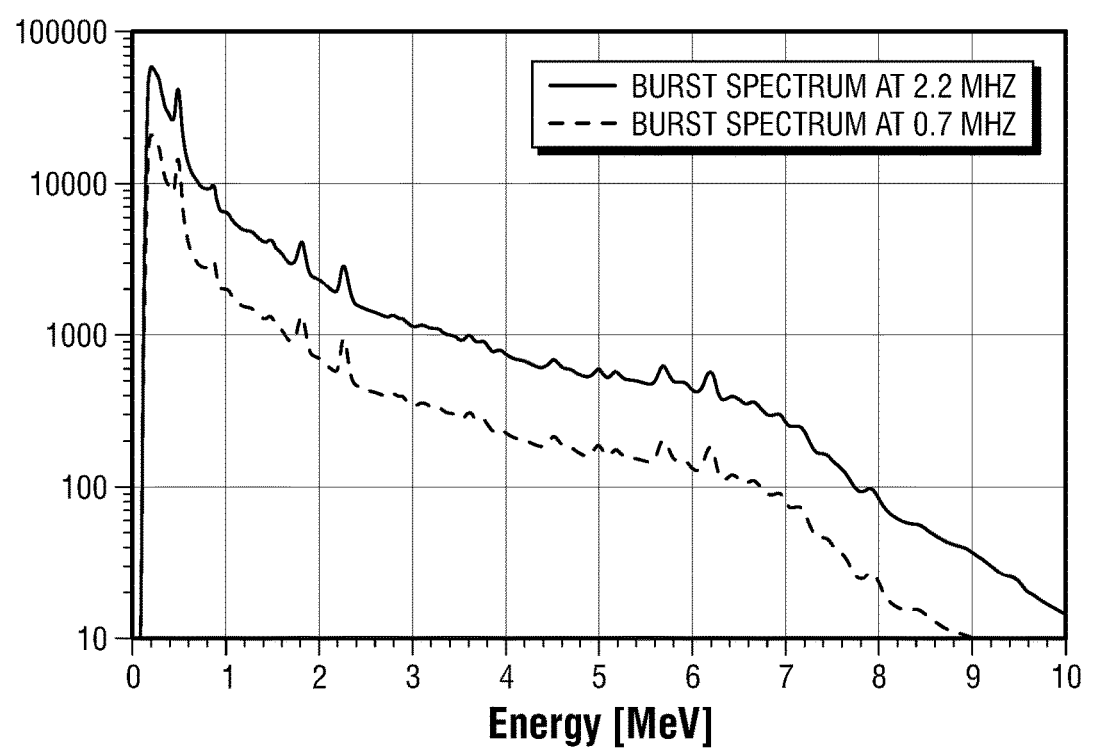
FIG. 24 shows a spectrum obtained with the tool shown in FIG. 23 deployed in a 0-p.u. sandstone formation during the burst at an instantaneous count rate of 2.2 MHz as well as a reduced count rate of only 0.7 MHz.
Figure 25:
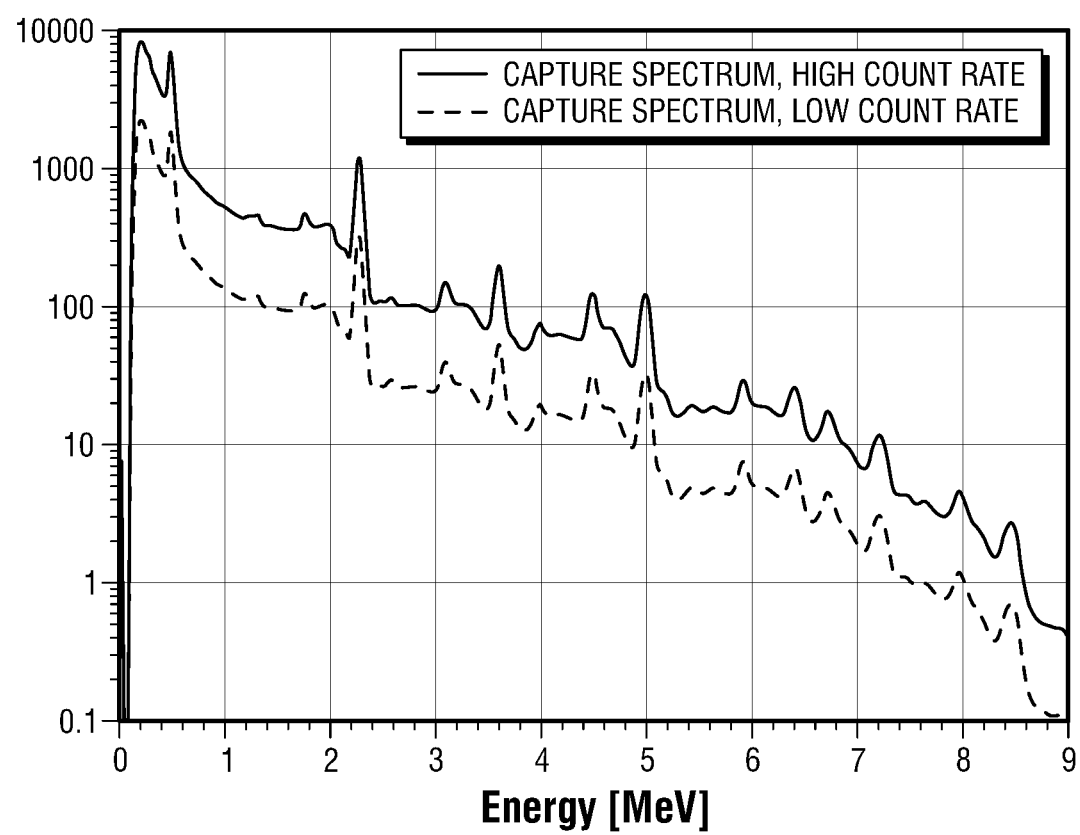
FIG. 25 shows a spectrum of gamma-rays obtained with the tool shown in FIG. 23 from thermal neutron capture recorded after the neutron burst at two different count rates.

FIG. 24 shows a spectrum obtained with the tool deployed in a 0-p.u. sand stone formation during the burst (so-called inelastic spectrum) at an instantaneous count rate of 2.2 MHz as well as a reduced count rate of only 0.7 MHz. The spectral resolution is unaffected by the high count rate. A small spectral discrepancy at high energy is due to a small amount of undetected pile up at 2.2 MHz (pulse pair resolution<40 ns). FIG. 25 shows spectra of gamma-rays from thermal neutron capture recorded after the neutron burst at two different count rates.

The system described above could also be used for downhole applications involving the detection of scattered gamma-rays or x-rays. Gamma-rays may be produced by a radioisotope source such as $^{137}$Cs. X-rays can be produced by a downhole x-ray generator. Such a generator can be a DC-x-ray generator as described in U.S. Pat. Nos. 7,817,781 and 7,668,293 or a linear accelerator or a suitable circular downhole accelerator like the Betatron described in U.S. Pat. Nos. 5,077,530, 5,319,314, 5,122,662. In the case of a high output DC X-ray generator, the periodic calibration of the integrator could be done by periodic short intervals during which the x-ray generator is turned off for time intervals of the order of a 1 ms every few seconds or minutes. The Linac and Betatron are pulsed devices and afford a quiescent period for calibration.

While an embodiment of the disclosure envisages downhole application in conjunction with a pulsed neutron generator, this disclosure is equally suited for any surface application requiring high performance spectroscopy and very high throughput. Such applications exist in Nuclear physics research, homeland security and medical imaging to name a few.

While the present disclosure is provided in the context of using a scintillation detector coupled to a photomultiplier, the methods and systems disclosed would apply equally to a scintillation detector coupled to another photon-electron converter such as a silicon photomultiplier or another light sensitive detection and/or amplification device. Possible scintillation materials that could be used are NaI(Tl) (Thallium-doped sodium iodide), CsI(Na) or CsI(Tl) (sodium or thallium doped cesium iodide), BGO (Bismuth Germanate), GSO:Ce (Ce-doped Gadolinium Oxy-Ortho-Silicate), LPS: Ce (Ce-doped Lutetium-pyrosilicate), LaBr$_3$:Ce, LaCl$_3$:Ce, LuAP:Ce, LuAG:Pr, YAP:Ce, YAP:Pr, SrI$_2$:Eu and many more that would be well known to one of ordinary skill in the art.

While the foregoing has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the present disclosure.

What is claimed is:

1. A method for acquiring spectral information from an energy sensitive nuclear detector comprising:
   detecting nuclear radiation at a detection device and generating an electronic input pulse indicative of energy deposited in the detection device;
   integrating the electronic input pulse at an integrating device to produce an integrated output signal;
   digitally sampling the integrated output signal of the integrating device at intervals to produce a stream of digital samples; and
   resetting the integrator synchronously with a sampling clock when a limit condition is reached,
   wherein pulse acquisition and integration continue without interruption during the resetting of the integrator.

2. The method of claim 1, further comprising determining and calibrating the integrated output signal during a quiescent period of the integrating device.

3. The method of claim 2, wherein the quiescent period comprises an off-period of a pulsed neutron generator.

4. The method of claim 1, wherein the integrating device produces the integrated output signal as a difference between a first sample after an end of integration of the electronic input pulse and a sample preceding a start of the electronic input pulse compensated by a quiescent integral for a same length of time.

5. The method of claim 2, further comprising disabling the electronic input pulse to create a quiescent period for the calibration.

6. The method of claim 1, further comprising digitally differentiating the stream of digital samples and obtaining a digital representation of the electronic input pulse.

7. The method of claim 6, further comprising estimating a baseline from the digitally differentiated stream of digital samples.

8. The method of claim 6, further comprising shaping the digitally differentiated stream of digital samples, thereby reducing the pulse length and improving pile up detection.

9. The method of claim 8, further comprising basing pile up detection on the shape of the digitally differentiated stream of digital samples.

10. The method of claim 8, further comprising determining a pulse arrival time based on a threshold crossing of the digitally differentiated stream of digital samples.

11. The method of claim 8, further comprising processing the detected pile up to remove the effect of the pile up on the pulse, resulting in a restored initial pulse.

12. The method of claim 1, further comprising analysis of the shape of the digital representation to distinguish pulses coming from the interaction of different kinds of nuclear radiation with the nuclear detector.

13. A downhole tool for acquiring spectral information, comprising:
   a generator configured to emit nuclear radiation into an earth formation surrounding a borehole;
   a nuclear detector, and;
   data processing circuitry configured to detect nuclear radiation and generate an electronic signal indicative of the energy deposited in a detection device;
   data processing circuitry configured to integrate the electronic signal indicative of the energy deposited in a detection device to produce an output signal;
   data processing circuitry configured to digitally sample the output signal at an interval to produce a digitized pulse stream;
   data processing circuitry configured to obtain the integral of the electronic signal from the digitized pulse stream and reset the data processing circuitry for integrating synchronously with a sampling clock when a limit condition is reached, wherein pulse acquisition and integration continue without interruption during the resetting of the integrator.

14. The tool of claim 13, further comprising a downhole memory in which acquired pulse heights are stored in a histogram.

15. The tool of claim 13, further comprising a link to a memory storage device at an uphole location, wherein said link transfers acquired pulse heights for storage in the memory storage device.

16. The tool of claim 13, said tool further comprising a conveyance means selected from the group consisting of wireline, slickline, coiled tubing, drillstring, and wired drill pipe.

17. The tool of claim 13, wherein the nuclear detector comprises a material selected from the group consisting of NaI, LaBr, LaCl, GSO, LSO, YAP, LuAG, LuAP, and LPS.

18. The tool of claim 13, wherein the generator comprises a pulsed neutron generator such as a d-T, t-T or d-D generator.

19. The tool of claim 13, where the generator comprises a DC x-ray generator comprising one of a pulsed device, a linear accelerator, and a circular accelerator.

20. The tool of claim 19, where the DC x-ray generator is configured for pulsed operation including off periods for predetermined time intervals, resulting in a quiescent signal period.

* * * * *